(12) United States Patent
Birkner et al.

(10) Patent No.: US 9,302,265 B2
(45) Date of Patent: *Apr. 5, 2016

(54) INLET VALVE FOR CHAMBER SYSTEMS AND SAMPLE CONTAINERS, AND CHAMBER SYSTEMS AND SAMPLE CONTAINERS WITH SUCH INLET VALVES

(71) Applicant: TECAN TRADING AG, Mannedorf (CH)

(72) Inventors: Nico Birkner, Meilen (CH); Thomas Iten, Zurich (CH); Marina Knoppke, Wetzkikon (CH); Markus Wiggli, Tann (CH)

(73) Assignee: TECAN TRADING AG, Mannedorf (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,339

(22) Filed: Sep. 1, 2015

(65) Prior Publication Data

US 2016/0023210 A1 Jan. 28, 2016

Related U.S. Application Data

(63) Continuation of application No. 14/342,997, filed as application No. PCT/EP2012/066704 on Aug. 28, 2012, now Pat. No. 9,140,367.

(30) Foreign Application Priority Data

Sep. 6, 2011 (CH) ........................................ 1462/11

(51) Int. Cl.
*B01L 99/00* (2010.01)
*B01L 3/00* (2006.01)
*F16K 1/32* (2006.01)
*F16K 21/04* (2006.01)

(52) U.S. Cl.
CPC ................. *B01L 3/523* (2013.01); *B01L 3/502* (2013.01); *B01L 3/508* (2013.01); *B01L 3/50825* (2013.01); *B01L 3/502738* (2013.01); *F16K 1/32* (2013.01); *F16K 21/04* (2013.01); *B01L 2300/04* (2013.01); *B01L 2300/044* (2013.01); *B01L 2300/049* (2013.01)

(58) Field of Classification Search
CPC .................................. B01L 3/502; G01N 1/31
See application file for complete search history.

(56) References Cited

U.S. PATENT DOCUMENTS

| 5,888,831 A | 3/1999 | Gautsch |
| 2002/0130100 A1 | 9/2002 | Smith |
| 2014/0242685 A1* | 8/2014 | Knoppke ................ B01L 3/502 435/289.1 |

FOREIGN PATENT DOCUMENTS

| DE | 10105753 C1 | 3/2002 |
| FR | 2878426 A1 | 6/2006 |
| WO | 9220449 A1 | 11/1992 |
| WO | 2009012808 A1 | 1/2009 |

* cited by examiner

*Primary Examiner* — Jyoti Nagpaul
(74) *Attorney, Agent, or Firm* — Notaro, Michalos & Zaccaria P.C.

(57) ABSTRACT

An inlet valve charges an inner chamber with liquid and has a first axis and an inlet opening with a tool that automatically recloses. The inlet valve has a valve body with a blocking element, and a pressing part; a valve space enclosing the valve body at least partly; a spring mechanism and a sealing element. An open passage region opens into the liquid passage of the pressing part and into the valve space. The spring mechanism presses a sealing surface of the blocking element against the sealing element in a closed position of the valve body. The valve body of the inlet valve can be brought to an open position by pressing the pressing part against the resistance of the spring mechanism. Chamber systems and sample containers with such inlet valves are also disclosed.

22 Claims, 4 Drawing Sheets

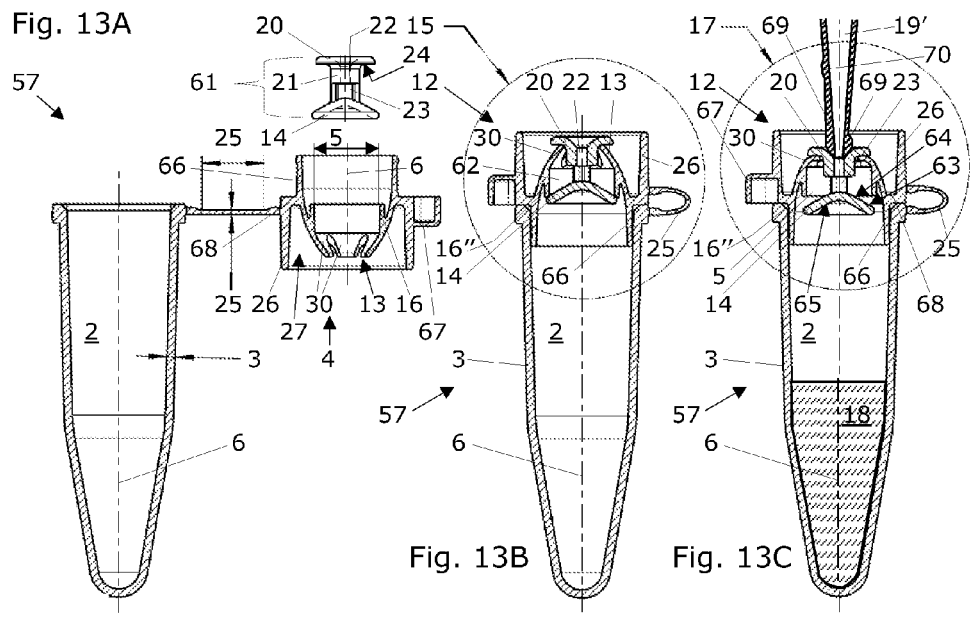
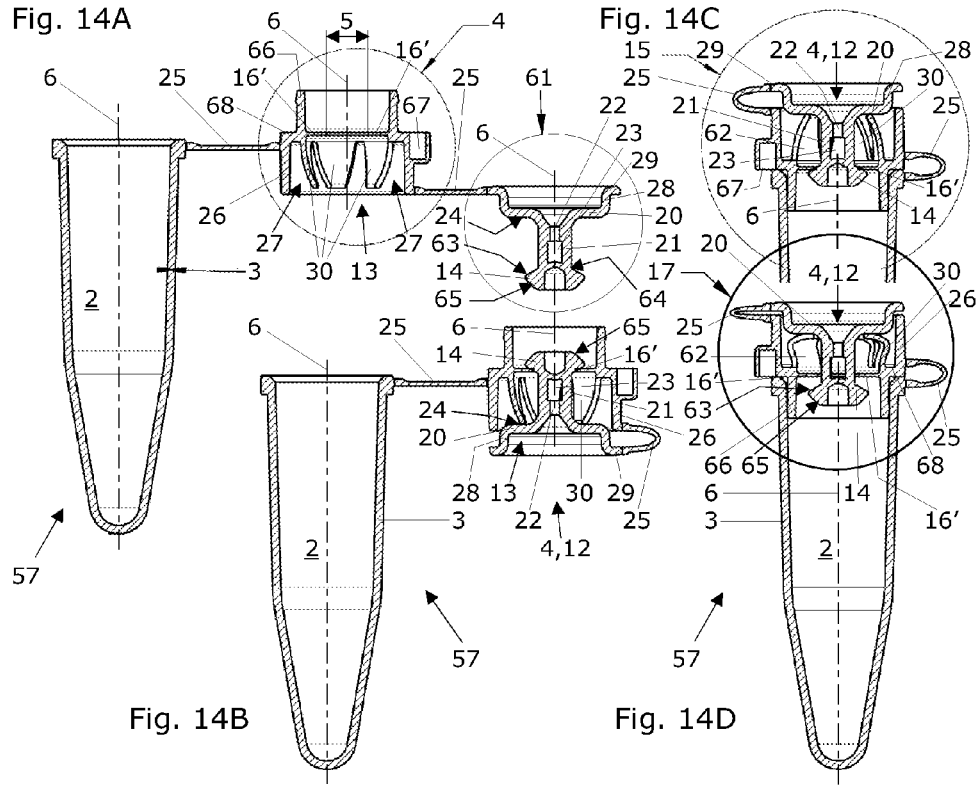

INLET VALVE FOR CHAMBER SYSTEMS AND SAMPLE CONTAINERS, AND CHAMBER SYSTEMS AND SAMPLE CONTAINERS WITH SUCH INLET VALVES

RELATED PATENT APPLICATIONS

This patent application is a continuation application of U.S. Ser. No. 14/342,997, now U.S. Pat. No. 9,140,367, issued Sep. 22, 2015, which is the national phase of the international application PCT/EP2012/066704 filed on Aug. 28, 2012, and which claims priority of the Swiss patent application No. 01462/11 filed on Sep. 6, 2011. The disclosure of all these patent applications is incorporated herein in its entirety for any purpose.

RELATED FIELD OF TECHNOLOGY

The invention relates to an inlet valve for charging an inner chamber of a chamber system or sample container with a liquid or for insertion of a sample into an inner chamber of a chamber system or sample container. The inlet valve is configured for supplying the liquid or sample by means of a tool, e.g. by means of a laboratory pipette, and comprises a first axis. Furthermore, the inlet valve comprises an inlet opening and it is configured to automatically reclose as such inlet opening. The invention further relates to chamber systems equipped with such inlet valves for the treatment of samples and respective sample containers with only one chamber.

RELATED PRIOR ART

Self-closing inlet valves for sample containers are known from the state of the art. The document WO 92/20449 A1 discloses a sealing lid with a non-return valve. It concerns a plug for test tubes (e.g. for blood samples), which is placed over the upper opening of a test tube in such a way that the upper edge of the tube engages in a circumferential groove of the plug in a sealing manner. The plug comprises a central depression on its upper side, which is downwardly sealed by two partial flanges directed towards each other. These partial flanges touch each other along a sealing line, which extends in a straight fashion and virtually over the entire diameter of the central depression. If a pipette or a needle is lowered into the region of said sealing line, it pushes the two elastic partial flanges apart, thus producing a through-hole in the plug. When the pipette or the needle are retracted, the two partial flanges move elastically against each other and re-seal the through-hole in the plug again. A removable lid which engages in a groove can be provided as an additional closure element. Said removable lid can also be arranged as a membrane that can be pierced.

The document DE 101 05 753 C1 discloses a closure for reagent containers, especially such with a screw cap. The closure in accordance with the invention comprises a conical or pyramid-shaped insert, the tip of which is directed against the filling material. Said insert is notched at least once and preferably symmetrically, thus forming tabs which form the bottom part of the cone or the pyramid up to the tip. A syringe needle or pipette is provided with a triggering sleeve, which encloses the needle or the pipette tip as an elongated rod-shaped body with a central borehole and which tapers at least at the bottom end against the needle or the pipette tip. The shape of the triggering sleeve and the distance of its bottom end from the end of the needle tip or pipette tip are adapted to the shape of the conical or pyramid-shaped insert, so that the triggering sleeve will touch a triggering web during the insertion into the conical or pyramid-shaped insert before the pipette tip itself can touch the closure.

The document US 2002/0130100 A1 discloses a closure apparatus for a container which is arranged as a double-closure apparatus with a convex seal that responds to pressure. The container is a microcentrifuge tube for example, which could also be referred to as an "Eppendorf tube". Further disclosures relate to a wiping mechanism, a one-piece construction, a manipulation-proof construction, a construction which allows limited exchange of air and still offers access to the liquid, and a sterile air-inlet and filter construction.

Chamber systems for the treatment of samples are also known. Especially biological, biochemical or chemical samples are of interest in this case. Exemplary treatment methods comprise the extraction of target molecules, especially of macromolecules (nucleic acid, proteins) or of low-molecular compounds (vitamins etc.), wherein solid-liquid extraction is preferably used. A typical chamber system comprises an inner chamber, a lid, an outer chamber and a transfer device. The inner chamber for accommodating and incubating biological samples for example is enclosed at least partly by an inner wall and can be sealed by a lid. The lid comprises an inlet opening leading to the inner chamber, which inlet opening defines a first axis, which penetrates the inlet opening. The outer chamber encloses the inner chamber at least in part. The outer chamber for collecting for example lysate with extracted nucleic acids is enclosed at least partly by an outer wall. The outer wall comprises a pipetting opening leading to the outer chamber, which defines a second axis, which penetrates the pipetting opening. The transfer device is arranged for fluidic connection of the inner chamber with the outer chamber.

A similar apparatus for the preparation of cytological samples with an inner chamber, a lid, an outer chamber and a transfer device (filter) is known from the document FR 2 878 426. This apparatus comprises a screw cap however, which needs to be removed both for adding samples and liquid to the inner chamber and also for removing liquid from the outer chamber. This known apparatus can therefore not be used or only within limits and with much effort in robotized or automated laboratory installations.

A chamber system for separating liquids from sample mixtures (e.g. solutions or suspensions) by means of extraction and/or filtering, which comprises an inner chamber, a lid, and outer chamber and a transfer device (filter or lattice), is known from the document U.S. Pat. No. 5,888,831. As a result of the eccentric arrangement of inner chamber and outer chamber, liquids separated from the inner chamber by means of eluting and/or centrifuging can be pipetted off from the outer chamber or the collecting chamber via a separate opening without having to open or disassemble the chamber system. However, the inlet opening to the inner chamber and the pipetting opening to the outer chamber are constantly open in this chamber system, so that losses of liquid caused by evaporation must be expected during the incubation of samples at increased temperature and/or over a prolonged period. The open construction also appears to be susceptible to cross-contaminations.

A chamber system in the form of a collecting/extraction container is known from the document WO 2009/012808. This chamber system for collecting solid forensic samples and for the extraction of biological material from said forensic samples comprises an inner chamber, a lid, an outer chamber and a transfer device. The inner chamber for receiving a swab and for incubating biological samples is enclosed at least partly by an inner wall and can be sealed by a lid. The lid seals an inlet opening leading to the inner chamber, which inlet opening defines a first axis penetrating the inlet opening. The outer chamber encloses the inner chamber at least in part. The outer chamber for collecting extracted nucleic acids is enclosed at least partly by an outer wall. The outer wall comprises a pipetting opening leading to the outer chamber, which pipetting opening defines a second axis penetrating the pipetting opening. The transfer device is arranged for the fluidic connection of the inner chamber to the outer chamber. An alternative lid seals both the inlet opening leading to the inner chamber and also the pipetting opening leading to the outer chamber. Although these lids can be inserted and removed again by a robotic tool, this kind of lid adds complexity to the automatic handling of the chamber system.

Eppendorf tubes (Eppendorf AG, Hamburg, Germany) shall be mentioned here as a known example for reversibly closable sample containers. The automatic charging of Eppendorf tubes requires the opening and/or closing of the lid of these tubes, which adds complexity to the automatic handling of said sample containers.

OBJECT AND SUMMARY OF THE PRESENT INVENTION

It is the object of the invention to propose an alternative, automatically reclosing inlet valve for charging the inner chamber of a sample container or a chamber system with a liquid or for insertion of a sample into an inner chamber of a chamber system or sample container and to propose a sample container or chamber system for the treatment of samples which is equipped with such an inlet valve.

The treatment of samples shall be understood below as any single-step and/or multi-step treatment of any solid, pasty or liquid material samples (e.g. biological, biochemical or chemical samples) under the influence of matter and/or energy, i.e. further substances and/or heat for example. This shall include for example chemical process steps and reactions (e.g. synthesis), and/or physical process steps (e.g. the extraction of target molecules, e.g. by solid-liquid extraction), and/or biochemical processes (e.g. incubation, lysis of cells, or polymerase-chain reaction (PCR)). The treatment of samples shall also include the collection, the storage, preservation, dispatch and transportation of samples.

The aforementioned object is achieved according to a first aspect by an initially mentioned inlet valve for charging an inner chamber of a chamber system or sample container with a liquid. The inlet valve is configured for supplying the liquid by means of a laboratory pipette and comprises a first axis. Furthermore, the inlet valve comprises an inlet opening and it is configured to automatically reclose said inlet opening. The inlet valve in accordance with the invention comprises:
  (a) a valve body, which is arrangeable in the inlet opening and is movable in the direction of the first axis between a closed position and an open position, which further comprises:
    a blocking element having a sealing surface;
    a pressing part which is subjectable to action by a tool, and which comprises a liquid passage in the region of the first axis;
    at least one open passage region, which is configured on the one hand to open into the liquid passage of the pressing part and is arranged on the other hand to open into a valve space;
  (b) a valve space at least partly enclosing the valve body;
  (c) a spring mechanism which is configured on the one hand to act on the pressing part or the blocking element and on the other hand to act on a wall of the chamber system or a closure element of the sample container, and
  (d) a sealing element which is connected to an inner wall of the chamber system or a closure element of the sample container.

According to the present invention, the spring mechanism is configured in such a way that it presses the sealing surface of the blocking element in the closed position of the valve body against the sealing element. Furthermore, the valve body of the inlet valve is configured in such a way that it can be brought to the open position by pressuring the pressing part against the resistance of the spring mechanism.

The aforementioned object is achieved according to a second aspect by a chamber system for the treatment of samples, wherein the chamber system comprises the following:
  (a) an inner chamber which is enclosed at least partly by an inner wall and is sealable by a closure element;
  (b) a closure element which comprises an inlet opening leading to the inner chamber, wherein said inlet opening defines a first axis which penetrates the inlet opening;
  (c) an outer chamber which encloses the inner chamber at least partly, and which is enclosed at least partly by an outer wall, wherein the outer wall comprises an opening leading to the outer chamber, which opening defines a second axis, and
  (d) a transfer device which is configured for the fluidic connection of the inner chamber to the outer chamber.

The chamber system in accordance with the invention comprises an already defined inlet valve comprising the inlet opening, e.g. for the supply of the liquid by means of a laboratory pipette.

The aforementioned object is achieved according to a third aspect by a sample container for storing or treating samples, wherein the sample container comprises the following:
  (a) an inner chamber which is enclosed at least partly by an inner wall and is sealable by a closure element;
  (b) a closure element which comprises an inlet opening leading to the inner chamber, wherein said inlet opening defines a first axis which penetrates the inlet opening.

The sample container in accordance with the invention comprises an already defined inlet valve comprising the inlet opening.

This discrete sample container with only one chamber has a certain similarity from a superficial standpoint to a so-called Eppendorf reaction vessel. These sample and analytical containers, which are also known as Eppendorf tubes, with a conical bottom part and a size of 1.5 ml for example consist of polypropylene and comprise a lid connected via a tab. The sample container in accordance with the invention differs therefrom by the inlet valve integrated in the lid, by means of which a liquid can be pipetted into the inner chamber without removing the lid and which automatically closes again in a sealing fashion.

Further characteristic and inventive features are provided in the respective dependent claims.

BRIEF DESCRIPTION OF THE ATTACHED DRAWINGS

The inlet valve, chamber system for the treatment of samples and the sample container in accordance with the invention will now be explained in closer detail by reference to the enclosed schematic drawings and by means of exemplary embodiments, without said drawings and embodiments limiting the scope of the present invention in any way, wherein:

FIGS. 2A-2E show vertical sectional views through a chamber system according to the first embodiment of FIG. 1, wherein:

FIG. 2A shows the lid of the chamber system in the non-inserted situation as in FIG. 1 during the insertion of a sample into the inner chamber;

FIG. 2B shows the lid of the chamber system in the inserted situation with the inlet valve in the closed position;

FIG. 2C shows the inlet of e.g. lysis-buffer liquid through the lid of the chamber system in the inserted situation with the inlet valve in the open position;

FIG. 2D shows the incubation of the sample in the inner chamber with the inlet valve in the closed position, and FIG. 2E the pipetting of e.g. lysate for example from the exterior chamber;

FIGS. 5A-5B show vertical sectional views through a chamber system according to a second embodiment with the lid of the chamber system in the inserted position and with the inlet valve in the closed position, wherein:

FIG. 5A shows a sectional view along the line of intersection A-A in FIG. 6; and FIG. 5B shows a sectional view along the line of intersection B-B in FIG. 6;

FIGS. 9A-9C show a chamber system according to a third embodiment, wherein

FIG. 9A shows a vertical sectional view transversely through the chamber system, in which the inlet valve arranged on the screw cap is shown in a closed position;

FIG. 9B shows a vertical sectional view longitudinally through the chamber system, in which the inlet valve arranged on the screw cap is also shown in the closed position, and FIG. 9C shows a 3D view of a valve element of said inlet valve produced as one piece;

Figure 7:
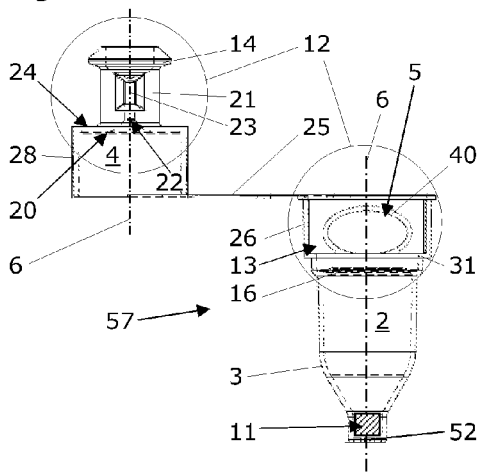
FIG. 7 shows a side view of an open, as one piece produced sample container-lid combination with only one chamber according to a first embodiment, wherein the chamber substantially corresponds to the inner chamber of the chamber system according to the second embodiment of FIGS. 5 and 6.
Figure 10:
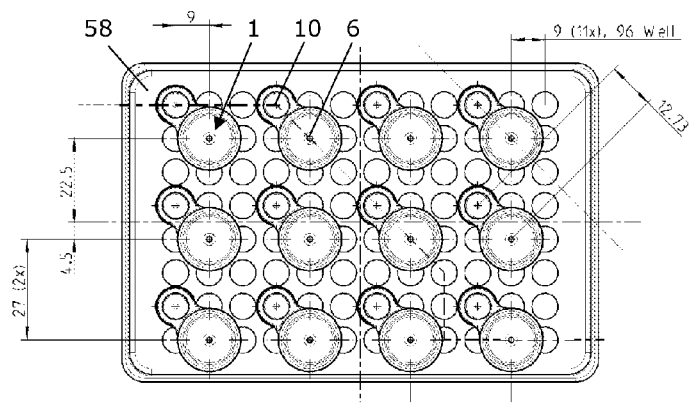
Figure 11:
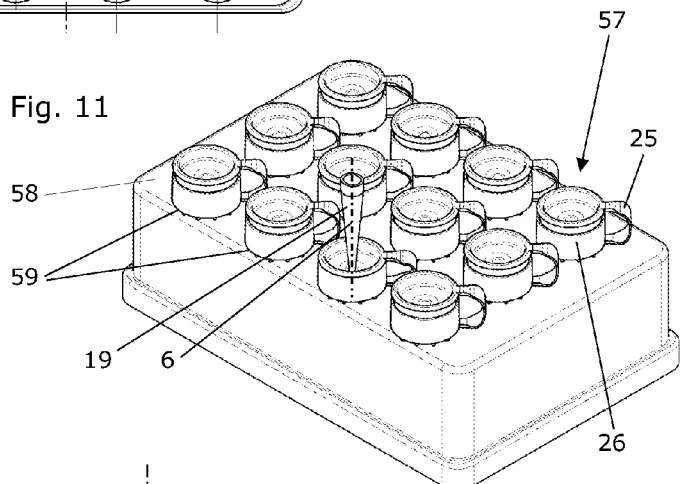
Figure 12:
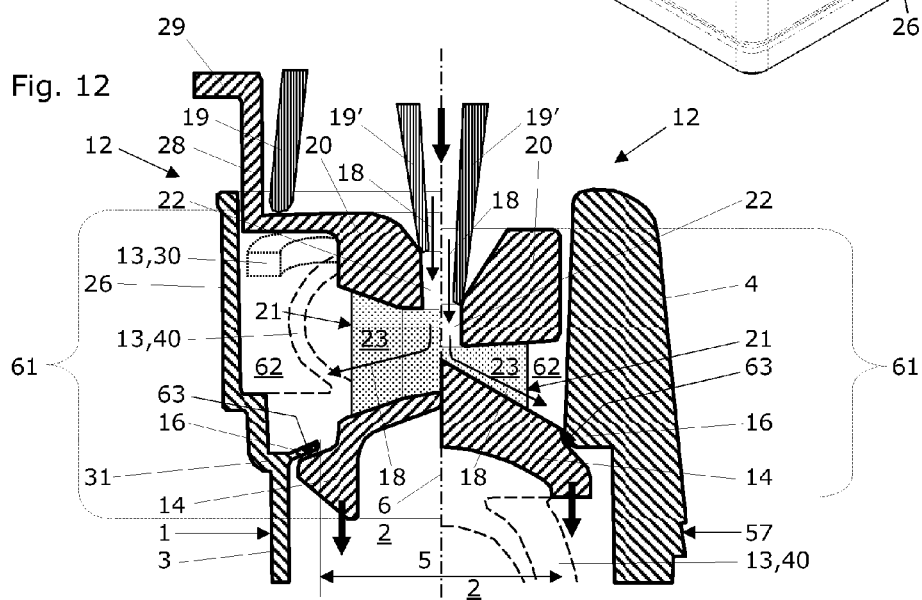

FIG. 10 shows a top view of a respective microplate tray (microplate carrier) with inserted chamber systems according to FIGS. 1 to 4, wherein all first and second axes of the chamber systems arranged in the manner of an array (matrix) are situated on the crossing points of an orthogonal grid, which corresponds to the arrangement of 96 wells (cups) of a standard microplate according to the ANSI standard;

FIG. 11 shows a 3D view of a respective microplate tray with inserted sample container-lid combinations with only one chamber according to FIG. 7, wherein all first axes of the respectively similarly arranged sample containers are situated on the crossing points of an orthogonal grid, which corresponds to the arrangement of 96 wells of a standard microplate according to the ANSI standard;

FIG. 12 shows a schematic vertical sectional view through the automatically reclosing, closed inlet valve for charging the inner chamber of a sample container or a chamber system with a liquid, wherein the left side illustrates the situation in FIGS. 1 to 8 and the right side the situation in FIG. 9;

FIGS. 13A-13C show a vertical sectional view through a second embodiment of a sample container in accordance with the invention, comprising a lid connected via an elastic tab, in which a separately produced valve body can be arranged for completing the automatically reclosing inlet valve in accordance with the invention, wherein:

FIG. 13A shows the open sample container with inner chamber and lid, and a valve body to be inserted into the lid;

FIG. 13B shows the closed sample container with the valve body in the closed position, and FIG. 13C shows the closed sample container with the valve body in the open position.

FIGS. 14A-14D show a vertical sectional view through a third embodiment of a sample container in accordance with the invention, comprising a lid connected via an elastic tab, on which a valve body produced as one piece with the lid and the sample container is attached by a further elastic tab, wherein:

FIG. 14A shows the open sample container with the inner chamber, lid and valve body;

FIG. 14B shows the open sample container with the inner chamber and the valve body inserted into the lid;

FIG. 14C shows the closed sample container with the valve body in the closed position, and FIG. 14D shows the closed sample container with the valve body in the open position.

DETAILED DESCRIPTION OF THE PRESENT INVENTION

Prior to the explanation of the details, the various embodiments of the inlet valve, chamber system or sample container in accordance with the invention shall be defined for the purpose of a better overview according to the embodiments of the relevant components and with respect to the drawings:

Inlet valve 12
    First embodiment according to FIGS. 1 to 4
    Second embodiment according to FIGS. 5 to 8
    Third embodiment according to FIG. 9
    Fourth embodiment according to FIG. 13
    Fifth embodiment according to FIG. 14

Figure 5A:
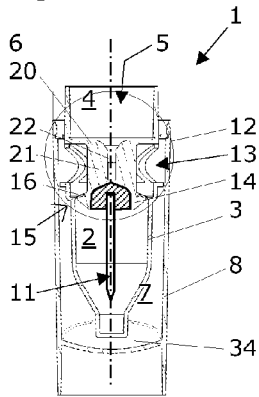
Figure 5B:
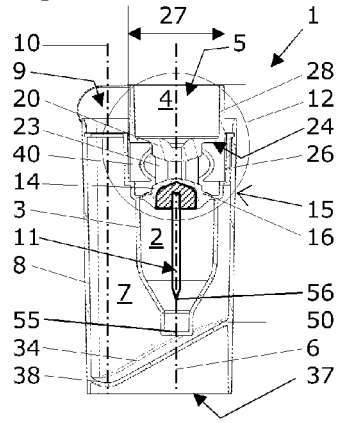
Figure 6:
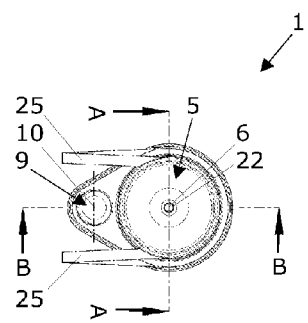
FIG. 6 shows a top view of a chamber system according to the second embodiment with the lid of the chamber system in the inserted situation and with the inlet valve in the closed position, wherein the lines of intersection for the vertical sectional views of FIG. 5 are shown.

Chamber system 1 with double chamber (inner and outer chamber)
    First embodiment according to FIGS. 1 to 4
    Second embodiment according to FIGS. 5 and 6
    Third embodiment according to FIG. 9

Figure 8:
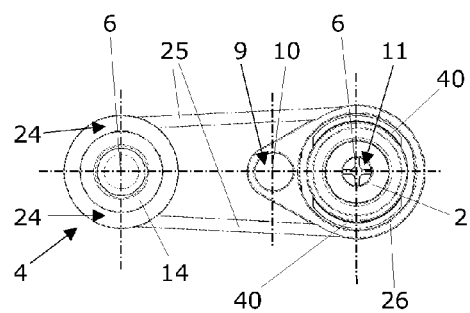
FIG. 8 shows a top view of this open, integrally produced sample container-lid combination of FIG. 7.

Sample container 57 with only one chamber (inner chamber)
    First embodiment according to FIGS. 7 and 8
    Second embodiment according to FIG. 13
    Third embodiment according to FIG. 14

Transfer device 11 with base element 52
    Retaining element 54 (e.g. filter) with base opening 53
    Pierceable base region 55 (e.g. membrane) and piercing tip 56, cf. FIG. 5
    Flap or further valve as base element 52, pin instead of piercing tip 56 as transfer device 11 for opening the flap or base valve Notice must be taken expressly at this point that the three components inlet valve 12, chamber system 1 and transfer device 11 can be combined freely, i.e. any embodiment of one of these components can be combined with any embodiment of the other two components. It shall also expressly be noted at this point that the different embodiments of these two components inlet valve 12 and sample container 57 can be combined freely with each other.

A general preliminary remark is made here with respect to the labelling in the drawings: the same reference numerals relate to the respective or the same or functionally identical elements, even though they are not visible in all drawings or are not described in the relevant text.

Figure 1:
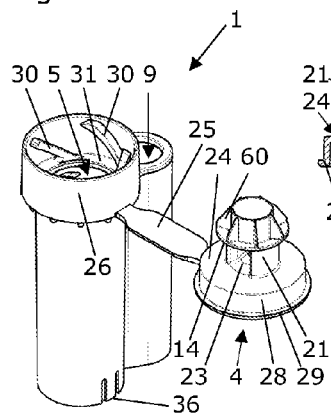
FIG. 1 shows a 3D view of a chamber system according to a first embodiment.

FIG. 1 shows a 3D view of a chamber system according to a first embodiment of the invention or the inlet valve 12 in a double-chamber system and with a retaining element 54 in the transfer device 11. Various positions and situations are shown in the vertical sectional views of FIGS. 2A, 2B, 2C, 2D and 2E. The chamber system 1 for the treatment of samples comprises an inner chamber 2, which is enclosed at least partly by an inner wall 3 and can be sealed by a lid 4. The lid 4 comprises an inlet opening 5 leading into the inner chamber 2, wherein said inlet opening 5 defines a first axis 6, which penetrates the center of the inlet opening 5. The inner chamber 2 is enclosed at least partly by an outer chamber 7, which is enclosed at least partly by an outer wall 8, wherein the outer wall 8 comprises a pipetting opening 9 leading to the outer chamber 7, which pipetting opening defines a second axis 10. The chamber system 1 further comprises a transfer device 11 which is arranged for the fluidic connection of the inner chamber 2 with the outer chamber 7.

In accordance with the invention, the chamber system 1 comprises an inlet valve 12 having the inlet opening 5 and a spring mechanism 13, and a blocking element 14, wherein the spring mechanism 13 is configured for exerting a spring force with which the blocking element 14 can be pressed in a closed position 15 in a sealing fashion against a sealing element 16 of the inlet opening 5, and wherein the blocking element 14 can be brought against the spring force of the spring mechanism 13 to an open position 17, so that the liquid 18 can be supplied through the inlet opening 5 to the inner chamber 2.

Guide ribs 60 are preferably integrally attached to the blocking element 14 of the lid 4 (cf. FIG. 1), which guide ribs are provided with a conical shape and are used during the closure of the lid as an insertion aid for the smooth and centric guidance of the blocking element 14 through the inlet opening 5 enclosed by the sealing element 16. FIG. 3 shows a detailed sectional view of the sealing element 16 (according to the circular segment in FIG. 2A) on an enlarged scale and as a sealing lip 16' by way of example.

In a preferred embodiment of the chamber system 1, the inlet valve 12 comprises a pressing part 20 which is produced as one piece with the blocking element 14 and which can be subjected to action by a tool 19, wherein the pressing part 20 is arranged via a constricted throat 21 at a distance from the blocking element 14 and is connected to the blocking element 14.

The invention also relates to an embodiment of a sample container with only one chamber, as shown in FIGS. 7 and 8. Such a sample container 57 comprises an inlet valve 12 for charging an inner chamber 2 of the sample container 57 with a liquid 18 and for reclosing the inner chamber 2, wherein the inner chamber 2 is enclosed at least partly by an inner wall 3 and is sealable by a lid 4, wherein the inlet valve 12 comprises an inlet opening 5 with a sealing element 16, a spring mechanism 13 and a blocking element 14, wherein said inlet opening 5 defines a first axis 6 which penetrates the inlet opening 5. The axis 6 preferably penetrates the center of the inlet opening 5.

The spring mechanism 13 is configured to exert a spring force, with which the blocking element 14 can be pressed in a closed position 15 in a sealing fashion against the sealing element 16 of the inlet opening 5, wherein the blocking element 14 can be brought against the spring force of the spring mechanism 13 to an open position 17 in such a way that a liquid 18 can be supplied through the inlet opening 5 to the inner chamber 2 of the chamber system 1 or sample container 57. The inlet valve 12 comprises a pressing part 20 which is produced as one piece with the blocking element 14 and can be subjected to action by a tool 19, wherein the pressing part 20 is arranged at a distance from the blocking element 14 via a constricted throat 21 and is connected to the blocking element 14.

The invention is also directed towards an inlet valve 12 as such in a preferred embodiment for charging the inner chamber 2 of a chamber system 1 or a sample container 57 with a liquid 18 and for reclosing the inner chamber 2, wherein the inlet valve 12 preferably comprises a pressing part 20 which is integrally produced with the blocking element 14 and can be subjected to action by a tool 19, wherein the pressing part 20 is arranged at a distance from the blocking element 14 via a constricted throat 21 and is connected to the blocking element 14.

In a chamber system 1, sample container 57 or inlet valve 12, the pressing part 20 preferably comprises a central liquid passage 22, which opens into an open passage region 23 of the constricted throat 21 between the pressing part 20 and the blocking element 14. The open passage region 23 is preferably laterally realized in form of two opposite openings, as are shown for example in FIGS. 1, 2B, 2D, 5B, 7, 9B and 9C.

In preferred embodiments of the chamber system 1, sample container 57 or inlet valve 12, the pressing part 20 further comprises stop surfaces 24 (cf. FIGS. 1, 2A, 2D, 2E, 5B and 7) which can be pressurized by the spring mechanism 13.

In the chamber system 1, sample container 57 or inlet valve 12, the sealing element 16 of the inlet opening 5 is further preferably configured as a continuous sealing lip 16', wherein said sealing lip 16' is arranged at a transitional point 31, preferably between a collar 26 connected integrally to the inner wall 3 and the inner wall 3 in an uninterrupted fashion on the inner circumference. The sealing lip 16' releases an opening, the cross-section of which is smaller than the geometrically similar cross-section of the blocking element 14. The shape of the cross-section can be polygonal or oval for example, but it is preferably circular. This means that the sealing lip 16' is especially preferably configured in a circular fashion and releases a circular opening, the diameter of which is smaller than the diameter of the blocking element 14 which is also preferably circular. A sealing element 16 or a sealing lip 16' can be found in the embodiments 1-3 and 5 of the inlet valve 12.

In an advantageous embodiment of the chamber system 1, the sample container 57 or the inlet valve 12 in which the lid 4 comprises the pressing part 20, the constricted throat 21 and the blocking element 14, the lid 4 latches into the sealing lip 16' during the closing insertion into the chamber system 1 in the inlet opening 5, in accordance with the functionality of the first embodiment of the inlet valve 12. This requires that the material of the sealing lip 16' must have a certain amount of elasticity, so that the blocking element 14, which has a larger cross-section, can be pressed through the inlet opening 5 with the smaller cross-section in the sealing lip 16', and the sealing lip can subsequently be relaxed again and performs the sealing and holding function against an opening of the lid 4. In one variant, the inner wall and the transitional region of the chamber and the integrally attached sealing lip consist of the same material (if it is sufficiently flexible). In an alternative variant, the closure element or the sealing lip consists of an elastomeric material or polymer which is attached to or injected by two-component injection molding onto the stiffer container material.

Thus, thermoplastic materials are preferably used for producing the items in accordance with the invention. Preferred materials are polyolefins for example such as polypropylene in particular, and optionally polyolefin elastomers for the sealing lip, or polyamides, especially transparent polyamides, and optionally polyamide elastomers or polyolefin elastomers adhering to polyamide for the sealing lip.

In a preferred embodiment of the chamber system 1, sample container 57 or inlet valve 12, the lid 4 is connected by means of an elastically deformable tab 25 to the collar 26, wherein the collar 26 encloses the spring mechanism 13 and comprises an upper opening 27 into which the lid 4 can be inserted. This is shown for example in FIGS. 1, 2A, 2C, 4, 6, 7 and 8. The tab 25 can comprise one or several film hinges for the purpose of increased bending flexibility.

In a further developed embodiment of such a chamber system 1, sample container 57 or inlet valve 12, the lid 4 further comprises a side wall 28 which is integrally attached to the pressing part 20 and which comprises a shoulder 29 on its upper end, wherein said shoulder 29, during the insertion of the lid 4 into the upper opening 27 of the collar 26 and during the pressurizing of the collar 26, defines a maximum open position 17 of the inlet valve 12 with maximum deformation of the spring mechanism 13 (see FIGS. 1 to 4, 12 and 14).

Figure 2A:
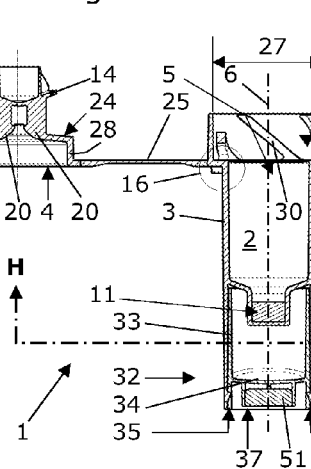

Preferably, a chamber system 1, sample container 57 or inlet valve 12 are additionally characterized in that the spring mechanism 13 comprises a number of obliquely upright spring elements 30, wherein said spring elements 30 are configured to be free-standing (with a gap to the collar 26) and are fixed at a transitional point 31 (on the ledge) between the collar 26 and the inner wall 3, as shown for example in FIGS. 1, 2A, 2B and 2C. These spring elements can be spring arms of approximately constant thickness, as shown in FIG. 2A for example. The variant with tapering spring arms which taper towards the free end is preferred however, because the spring effect is much smoother with decreasing thickness and distributes over a larger region of the spring arm, as a result of which the material loading in the spring arm is less high in certain points.

It is advantageous for profitability if the inner wall 3, the lid 4 and the inlet valve 12 of the chamber system 1 or the sample container 57 are configured as an integral, one piece element in a chamber system 1 or a sample container 57. Such an integral element is preferably produced by injection molding.

In a preferred embodiment of a chamber system 1, it comprises a base insert 32, wherein the base insert 32 comprises an insert wall 33 and a base 34 which deviates from the horizontal, and wherein the base insert 32 is pushed into the outer chamber 7 and rests with the insert wall 33 preferably in a sealing fashion on the outer wall 8 enclosing the outer chamber 7. Such an embodiment is shown in FIGS. 2A, 2B, 2C, 2D and 2E.

Figure 2B:
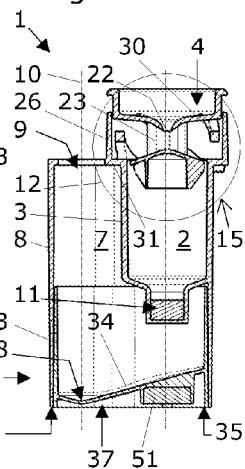
Figure 2C:
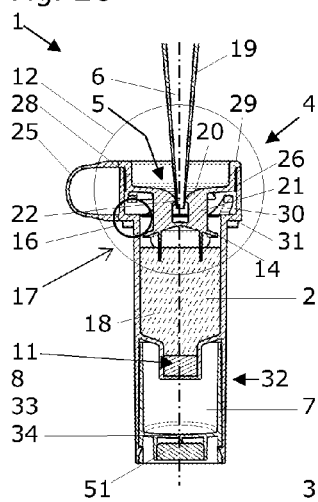
Figure 2D:
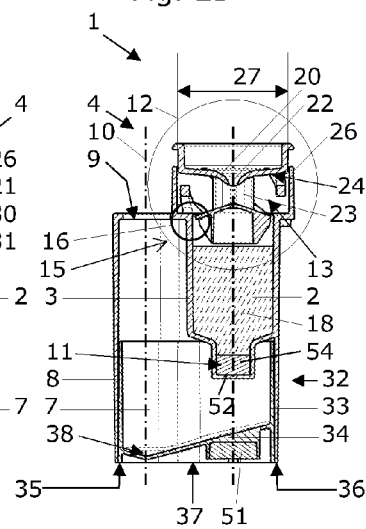
Figure 2E:
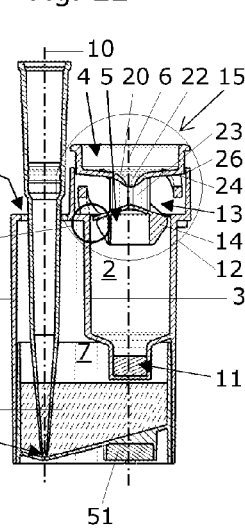
Figure 3:
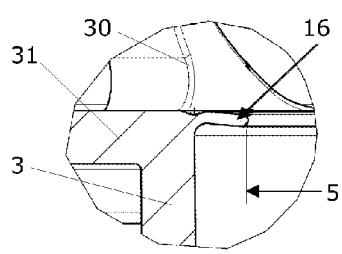
FIG. 3 shows a detailed sectional view through the closure element which is marked in FIG. 2D by a circle.
Figure 4:
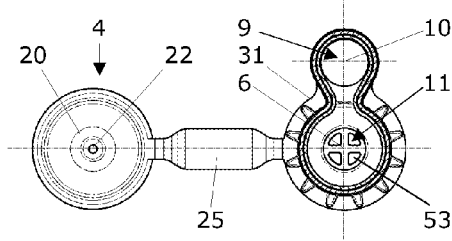
FIG. 4 shows a horizontal sectional view through the chamber system with a bottom view of the open lid according to the line of intersection H-H in FIG. 2A.

In a preferred embodiment of a chamber system 1, the base insert 32 comprises a bottom edge 35, wherein the bottom edge 35 of the base insert 32 defines a base area 37 of the chamber system 1 together with a bottom edge 36 of the outer wall 8. This is shown in FIGS. 2A, 2B and 2D. A base area 37 can also be formed by the outside wall 8 alone in other variants of a two-chamber system, as shown in FIGS. 5B and 9B.

Concerning the spring mechanism 13, a chamber system 1, sample container 57 or inlet valve 12 are characterized in an alternative variant in such a way that the spring mechanism 13 comprises spring rings 40, wherein said spring rings 40 are arranged in a free-standing manner and are preferably fixed to a transitional point 31 between the collar 36 and the inner wall 3. Such spring rings 40 are contained in the second embodiment of the inlet valve 12 in FIGS. 5A, 5B and 7.

Figure 9A:
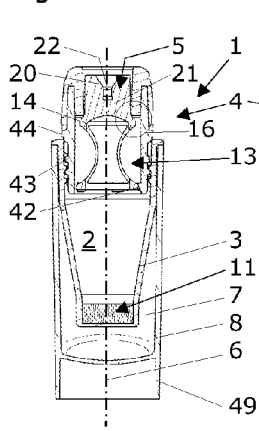
Figure 9B:
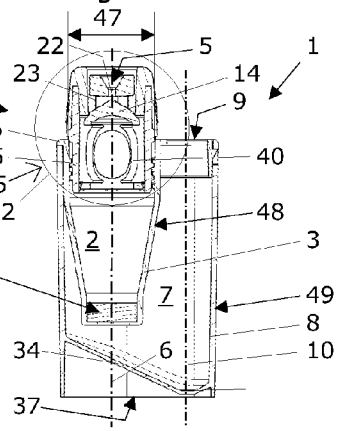

In a chamber system 1 with spring rings 40, the collar 26 which is connected to the inner wall 3 preferably comprises a shoulder 46, which comprises the pipetting opening 9 leading to the outer chamber 7, wherein said shoulder 46 is arranged for the latching connection to the outer wall 8 (see FIG. 9B for example). A chamber system 1 according to this embodiment comprises a base part 50 in a variant, wherein the base part 50 comprises the outer wall 8 and a base 34 deviating from the horizontal, and wherein the base part 50 comprises a circumferential groove on the inside of the outer wall, into which the shoulder 46 of the collar 26 connected to the inner wall 3 can latch.

Figure 9C:
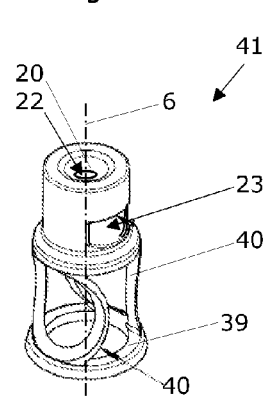

It is further preferable if in a chamber system 1, sample container 57 or inlet valve 12 the pressing part 20 further comprises the spring mechanism 13. This corresponds to the third embodiment of the inlet valve 12, in which the spring mechanism is preferably realized in form of integrated spring rings 40 (see FIG. 9C). It is further preferable in such a chamber system 1, sample container 57 or inlet valve 12 that the spring mechanism 13 comprises at least one ejection element 39, wherein said ejection element 39 is preferably held on the lid 4. An especially preferred variant of such a chamber system 1, sample container 57 or inlet valve 12 is characterized in that the spring mechanism 13 comprises spring rings 40, wherein said spring rings 40 connect the blocking element 14 to the at least one ejection element 39, and wherein said spring rings 40 are produced as an integral valve element 41 together with the pressing part 20, the throat 21, the blocking element 14 and the at least one ejection element 39. Such an integrally produced valve element is shown in FIG. 9C.

It is preferred in a chamber system 1, sample container 57 or inlet valve 12 that the lid 4 comprises snap-in cams 42, and an integral valve element 41 can be inserted via said snap-in cams 42 from below into the lid 4 and are held by said snap-in cams 42 and the ejection element 39 (see FIG. 9A).

With respect to the preceding embodiment, a preferred embodiment of a chamber system 1, sample container 57 or inlet valve 12 is characterized in that the lid 4 comprises an outer thread 43 and a stop ring 44, wherein the inner wall 3 enclosing the inner chamber 2 comprises an inner thread 45, which is complementary to said outer thread 43, and a shoulder 46 with an opening 47, and wherein the lid 4 can be twisted by means of its outer thread 43 at least partly through said openings 47 into the inner thread 45 until its stop ring 44 rests on the shoulder 46. This is shown by way of example in FIGS. 9A and 9B.

It is preferred that in a chamber system 1 according to the preceding description the shoulder 46 comprises the pipetting opening 9 leading to the outer chamber 7 and an insert wall 33, wherein the inner wall 3, the shoulder 46 and the insert wall 33 are configured as an integral insert 48 which is preferably produced by injection molding (see FIG. 9B). A resulting preferred chamber system 1 is characterized in that it comprises an outer part 49 with an outer wall 8, having a base 34 deviating from the horizontal and a standing surface 37, wherein the insert 48 is inserted into the outer chamber 7 and rests with the insert wall 33 on the outer wall 8 enclosing the outer chamber 7 (see FIGS. 9A, 9B).

In the case of a chamber system 1 with a base 34 which deviates from the horizontal it is generally advantageous if the base 34 deviating from the horizontal comprises a lowermost position 38 which is arranged axially to the second axis 10 and in the geometric projection of the pipetting opening 9 leading to the outer chamber 7 (see FIGS. 2B, 2D, 2E, 5B and 9B). As a result, the liquid can be pipetted out of the outer chamber 7 at the lowermost point.

In a general embodiment of the chamber system 1, the transfer device 11 comprises a base element 52 connected to the inner wall 3, wherein the base element 52 is configured to be non-permeable for a liquid 18 in a static state of the chamber system 1. Such a base element is shown in FIG. 2D. The absence of acceleration, increased static pressure or mechanical force on the base element shall be understood as the static state of the chamber system 1.

A chamber system 1 with a base element 52 is characterized in a preferred variant in such a way that the base element 52 comprises at least one base opening 53 (see FIG. 4 for example) and a retaining element 54 (see FIG. 2D) which covers the at least one base opening 53, wherein the retaining element 54 can only be passed by a liquid 18 with increased acceleration and/or increased static pressure. Increased acceleration can be produced by centrifuging for example. An increased static pressure can be produced alternatively or additionally by pressurizing with a compressed gas, e.g. compressed air. The retaining element 54 can concern a fine-pored filter for example.

A chamber system 1 with another variant of a base element 52 is characterized in that the base element 52 comprises a pierceable base area 55, wherein the blocking element 14 comprises a piercing tip 56, which penetrates the pierceable base area 55 (e.g. a membrane) upon reaching a maximum opened position 17 of the inlet valve 12. This variant of the transfer device is shown in FIGS. 5A and 5B.

Further variants of a base element 52 can be formed in a chamber system 1 by a flap or a further valve, by a pin (for exerting a mechanical force) instead of a piercing tip 56 as the transfer device 11 for opening the flap or the base valve. Alternatively, said flap can be opened by increased acceleration and/or increased static pressure.

The material samples, which can generally concern biological or also forensic samples, are introduced manually into the inner chamber 2 and the lid 4 is subsequently closed manually. An identification element 51 beneath the base of the chamber system (see FIGS. 2A, 2B, 2C, 2D and 2E) is used for specific labelling. RFID identification labels (RFID tags) or bar codes (such as 1D stripe pattern or 2D raster) are suitable for automated identification for example.

It is useful for the automated handling of the samples or the treatment and analysis of a plurality of samples to place the chamber system 1 or sample containers 57 in a tray with suitable openings (seats). FIG. 11 shows a respective microplate tray 58 for accommodating chamber systems 1 or sample containers 57, wherein the microplate tray 58 comprises a specific number of seats 59, which are adjusted with respect to their size to the dimensions of the outside walls 8 of the chamber systems 1 or the inner walls 3 of the sample containers 57 in such a way that the chamber systems 1 or sample containers 57 can be inserted tightly in an interlocking fashion into said seats 59 and preferably with surface contact.

The seats 59 are preferably arranged in a respective microplate tray 59 in an array, so that the first axes 6 of the chamber systems 1 or sample containers 57 stand perpendicularly to a base area of the microplate tray 58 and are arranged in an orthogonal grid whose grid points correspond to the central points of wells of a microplate according to ANSI standard, e.g. 8×12=96 well microplate. This preferred arrangement of the seats is shown in FIG. 10 by a superimposed microplate standard grid under the chamber systems. It is shown that the chamber systems are preferably dimensioned in such a way that the second axes 10 also come to lie on the standard grid coordinates. As a result, the handling of the trays and efficient pipetting of the samples is enabled with available laboratory robots with standard settings.

In the case of biological samples, they are often lysed in order to obtain their cell content. The fracturing of cells (i.e. the cell walls) is known as lysis, so that proteins and DNA (nucleic acid) are accessible as target molecules. This lysate is subsequently used for different follow-up tests and analyses. Lysis is carried out by chemical and/or mechanical means, preferably at increased temperatures. The sample containers must therefore be supplied with heat, which can occur for example by heating with hot air, in a water bath or oil bath or hot sand. It is appropriate in the present invention to choose the carrier plate or the microplate tray 58 in particular from a thermally conductive material, e.g. in form of an aluminum rack, i.e. a holding block made of aluminum with matching depositing openings, which can be heated indirectly or directly (with integrated heating) and thus transfers the heat to the tight-fitting inserted containers.

For the purpose of illustrating such an application of the invention, a fully prepared example with a specific method will be explained below, without said example limiting the scope of the present invention in any way. The invention therefore also relates to a method for incubating samples and for extracting target molecules, wherein the method comprises the following working steps:

(a) Accommodation of a sample comprising target molecules in an inner chamber 2 of a chamber system 1, which comprises the inner chamber 2 and an outer chamber 7 which partly encloses said inner chamber 2, wherein the inner chamber 2 is enclosed at least partly by an inner wall 3 and can be sealed by a lid 4, and wherein the outer chamber 7 is enclosed at least partly by an outer wall 8 which comprises a pipetting opening 9 leading to the outer chamber 7;

(b) adding a lysis buffer to the sample in the inner chamber 2;

(c) sealing the inner chamber 2 with the lid 4;

(d) incubation of the sample provided with the lysis buffer under increased temperature, lysis of cells containing the target molecules and receiving the target molecules in the lysis buffer;

(e) transfer of the lysis buffer with the target molecules to the outer chamber 7 with a transfer device 11 which is configured for fluidically connecting the inner chamber 2 to the outer chamber 7, and (f) removal of the extracted target molecules from the outer chamber 7.

This method in accordance with the invention for incubating samples and for the extraction of target molecules is characterized in that the adding of the lysis buffer to the sample in the inner chamber 2 occurs by means of an inlet valve 12 of the chamber system 1 and through an inlet opening 5 of the lid 4 and the inlet valve 12 leading into the interior chamber 2, wherein the inlet valve 12 comprises a blocking element 14 and a spring mechanism 13 which is configured for exerting a spring force, with which the spring mechanism 13 presses the blocking element 14 in a closed position in a sealing fashion against the inlet opening 5, and wherein the blocking element 14 is brought to an open position 17 against the spring force of the spring mechanism 13 for adding the lysis buffer to the sample in the inner chamber 2.

It is preferable in this method that the adding of the lysis buffer occurs via a central liquid passage 22 of the inlet valve 12, which opens into an open passage region 23 of a constricted throat 21 between a pressing part 20 and the blocking element 14.

Furthermore, this method preferably uses a microplate tray 58 in form of a heated aluminum rack, in which the chamber system 1 was inserted in a tightly fitting manner, in working step (d), i.e. during the incubation of the sample to which the lysis buffer was added under increased temperature, the lysis of the cells containing the target molecules and the receiving of the target molecules in the lysis buffer.

The proposed chamber system with inlet valve or the sample container with the inlet valve can be used in a highly versatile way for a large variety of treatments of any samples, e.g. biological, biochemical or chemical samples. The invention therefore also relates to the use of a chamber system 1 or a sample container 57 for the treatment of samples, wherein the treatment is especially chosen from the group comprising chemical reactions, synthesis, incubation, lysis, extraction, solid-liquid extraction, polymerase chain reaction (PCR), storing and transporting.

The disadvantages of the state of the art are overcome in an inventive manner with this novel chamber system or sample container for the treatment of samples. A system is provided which is highly advantageous for automated examinations in robotized laboratory installations. In particular, forensic serial examinations (identification by DNA screening) can thus be performed in a highly efficient way.

FIG. 12 shows a schematic vertical sectional view through the automatically reclosing inlet valve 12 for charging the inner chamber 2 of a sample container 57 or a chamber system 1 with a liquid 18, wherein the left side shows the situation in FIGS. 1 to 8 and the right side the situation in FIG. 9. Said inlet valve 12 is configured for adding the liquid 18 (see arrows) by means of a laboratory pipette 19' and comprises a first axis 6. Furthermore, the inlet valve 12 comprises an inlet opening 5 (see double arrow) and it is configured in an automatically reclosing fashion as such inlet opening 5. Said inlet valve 12 comprises a valve body 61 which is arranged in the inlet opening 5 and is movable in the direction of the first axis 6 between a closed position 15 (shown here) and an open position 17 (not shown here).

The valve body 61 is preferably produced as one piece or is at least configured as one piece, and comprises:
- a blocking element 14 with at least one sealing surface 63;
- a pressing part 20 which is spaced from the blocking element 14 and can be subjected to action by a tool 19,19', and which comprises a liquid passage 22 in the region of the first axis 6, and
- a throat 21 which connects the blocking element 14 and the pressing part 20 to each other, and which comprises at least one open passage region 23 which is configured on the one hand to open into the liquid passage 22 of the pressing part 20 and on the other hand to open into a valve space 62.

The throat 21 of the valve body 61 connects the blocking element 14 and the pressing part 20 which is spaced therefrom in a rigid manner to each other, so that the blocking element 14 and the pressing part 20 always assume the same position with respect to each other, irrespective of whether or not the pressing part 20 is subjected to action by a tool 19 or a laboratory pipette 19' (i.e. a pipette tip or dispenser tip). A "tool" is regarded as any apparatus in connection with the present invention with which the pressing part 20 is pressurized simultaneously with the approach of a pipette tip or dispenser tip to the liquid passage 22 and the valve body 61 of the inlet valve 12 can thus be brought to an open position 17. Alternatively, the pressing part 20 can be subjected to action by such a tool 19 already before and/or also after the approach of a pipette tip or dispenser tip to the liquid passage 22. Pipette tips or dispenser tips are also regarded in the broadest sense as a "tool 19", because the valve body 61 of the inlet valve 12 can also be brought to an open position 17 by these items alone.

All pipettes or dispensers are designated as "laboratory pipettes 19" in connection with the present invention which can be used in a laboratory, irrespective of whether they are manual pipettes or robotized pipettes of a laboratory workstation for receiving and supplying liquid samples, or respectively arranged dispensers for dispensing liquid samples.

The blocking element 14, the pressing part 20 and the throat 21 of the valve body 61 are configured to be penetrated by the first axis 6. Furthermore, the inlet valve 12 comprises a valve space 62 enclosing the valve body 61 at least partly in the region of the throat 21, so that the liquid 18 entering through the liquid passage 22 and the open passage region can reach the space between the sealing surface 63 and the sealing element 16 and can flow into the inner chamber 2 of the chamber system or the sample container 57 if the valve body 61 of the inlet valve 12 is in the open position 17.

Said inlet valve 12 further comprises a spring mechanism 13; 30; 40, which is configured to act on the pressing part 20 (cf. FIGS. 1-8 and FIGS. 13-14) or on the blocking element 14 (cf. FIG. 9) on the one hand and to act on a wall 3 of the chamber system 1 (cf. FIGS. 1-8) or on a closure element 4 (cf. FIG. 9 and FIGS. 13-14) of the sample container 57 on the other hand. Preferably, the closure element 4 is configured as a reversibly closable lid or as a closure element of a chamber system 1 or a sample container 57 and comprises the pressing part 20, the throat 21 and the blocking element 14. The closure element 4, which is preferably configured as a reversibly closable lid, latches into an inlet opening 5 of a sealing lip 16' during the sealing insertion into the chamber system 1 or into the sample container 57 and is connected in a preferred embodiment to a collar 26 of the chamber system 1 or the sample container 57 by means of an elastically deformable tab 25.

Said inlet valve 12 further comprises a sealing element 16 which is connected to an inner wall 3 of the chamber system 1 or a closure element 4 of the sample container 57.

The inlet valve 12 in accordance with the invention is especially characterized in that the spring mechanism 13; 30; 40 is configured in such a way that it presses the sealing surface 63 of the blocking element 14 in the closed position 15 of the valve body 61 against the sealing element 16, and wherein the valve body 61 of the inlet valve 12 is configured in such a way that it can be brought to the open position 17 by pressing the pressing part 20 against the resistance of the spring mechanism 13; 30; 40 (see bold arrows in the opening direction). Such an inlet valve 12 is preferred in which the liquid passage 22 is arranged concentrically in relation to the first axis 6. Preferably, the spring mechanism 13 is configured as a number of upright spring elements 30 or a number of spring rings 40.

Due to simpler production, a valve body 61 is especially preferred which is configured in a rotationally symmetrical way and comprises a circular sealing surface 63, wherein the sealing surface 63 is preferably arranged on an exterior side 64 of the blocking element 14 of the valve body 61 and forms an annular sealing connection with the sealing element 16 in the closed position 15 of the inlet valve 12. An inlet valve 12 is especially preferred in which the sealing element 16 is configured as an annular continuous sealing lip 16' or as a continuous annular web 16" and releases the inlet opening 5, the cross-section of which is smaller than the geometrically similar cross-section of the blocking element 14 (see FIG. 12). Preferably, the blocking element 14 is configured in the manner of a shell and comprises a convex exterior side 64 which is arranged to face the throat 21 and which is further spaced from the pressing part 20 with increasing distance from the first axis 6, wherein the shell-like blocking element 14 preferably comprises a concave inner side 65 which is arranged on the side facing away from the throat 21.

Alternatively, the closure element 4, which is configured as a reversibly closable lid, further comprises the spring mechanism 13 and is configured such that it can be screwed into the chamber system 1 or the sample container 57 in order to seal them, wherein the pressing part 20 further preferably comprises the spring mechanism 13.

In all FIGS. 1 to 14, the throat 21 is arranged concentrically in relation to the first axis 6 and has a cross-section, which is reduced in relation to the blocking element 14 and the pressing part 20. Furthermore, the throat is always shown as a massive column with a recessed liquid passage 22 and two open passage regions 23. Deviating from this illustration, the throat 21 can also be configured as a hollow tube, the cavity of which forms the liquid passage 22 (not shown). Said tube can comprise lateral breakthroughs which are configured as open passage regions 23 (not shown). Generally, a single open passage region 23 will be sufficient, which is preferably configured to originate substantially at a right angle from the first axis 6. It is advantageous however to configure the valve body 61 in a mirror-symmetrical or rotationally symmetrical way, so that two or more open passage regions 23 are formed.

FIG. 13 shows a vertical sectional view through a second embodiment of a sample container 57 in accordance with the invention, comprising a lid 4 which is connected via an elastic tab 25, in which a separately produced valve body 61 can be arranged for completing the automatically reclosing inlet valve 12 in accordance with the invention.

FIG. 13A shows the open sample container 57 with inner chamber 2 and lid 4, and a valve body 61 to be inserted into the lid 4, which valve body is shown in this case in the illustration with the same orientation as in the closed state of the sample container 57 (see sectional view of the valve body 61 in FIG. 13B). This valve body 61 can be produced as one piece (preferably by means of injection molding techniques). Alternatively, the valve body 61 can be produced in an integral fashion in that two parts of the said valve body 61 (preferably produced by means of injection molding techniques) are rigidly connected to each other to one piece by means of friction welding or other suitable methods.

The valve body 61 must be rotated by 180° for inserting the valve body 61 into the closure element 4 or into the lid, so that it enters the lid 4 at first with the pressing part 20 from above until the stop surfaces 24 of the pressing part 20, after having pushed the spring elements 30 apart, come to lie on the ends of the spring elements 30. In order to ensure that the valve body 61 can reach this position, it needs to be moved against the resistance of the slightly deforming blocking element 14 resting on the sealing element 16 in the direction of the first axis 6 slightly beyond the closed position 15. In the closed position 15, the valve body 61 is pressed with its sealing surface 63 in a sealing fashion against the sealing element 16 by the slightly deformed spring elements 30.

The sealing element 16 is configured in this case as a continuous annular web 16" and releases the inlet opening 5, the cross-section of which is smaller than the geometrically similar cross-section of the blocking element 14. Preferably, the annular web 16" extends substantially parallel to the first axis 6. It is especially preferred in this respect that the internal diameter of the annular web 16" expands upwardly in FIG. 13A merely to such an extent as is required for a smooth removal from the mold after the injection molding of the sample container/lid combination.

FIG. 13B shows the closed sample container 57 with the valve body 61 in the closed position 15. The sample container 57 of FIG. 13A was sealed after the insertion of the valve body 61 by introducing the closure element or lid 4 which is connected to the sample container 57 via a flexible, deformable tab 25. In this state there is frictional engagement between an annular insertion wall 66 of the lid 4 and the inner wall 3 of the sample container 57. The lid 4 preferably comprises a nose 67 on the side which is opposite of the flexible, deformable tab 25, which nose simplifies the opening of the lid 4. The collar 26 and the annular insertion wall 66 of the lid 4 are preferably connected to each other by a shoulder 68. Said shoulder 68 forms a stop for the upper edge of the inner wall 3 of the sample container 57 during the insertion of the lid 4 into the sample container 57, so that the lid 4 and therefore also the inlet valve 12 always precisely assume the same position in their closed state. It is highly advantageous for the automated or robotized supply of liquids 18 to the inner chamber 2 of the sample container 57 that the lid 4 of the sample container 57 and therefore also the valve body 61 are always located precisely at the same location. A microplate tray 58 for accommodating such sample containers 57 (see FIG. 11) was already explained above and substantially facilitates the precise alignment and secure holding of the sample containers 57. The valve space 62 is clearly shown, which encloses the valve body 61 at least partly in the region of throat 21.

FIG. 13C shows the closed sample container 57 with the valve body 61 in the open position 17. The valve body 61 assumes said open position 17 after a movement in the direction of the first axis 6 because it was moved downwardly against the resistance of the elastic spring elements 30. This movement ensures that the sealing surface 63 on the convex exterior side 64 of the blocking element 14 is moved away to such an extent from the sealing element 16 configured as a continuous annular web 16" that the inlet opening 5 is opened at least partly for allowing the flow of the liquid 18.

In this FIG. 13 C (which deviates from the illustration in FIG. 12), a pipette or dispenser tip 19' is shown with a substantially terminal piston-shaped reinforced part 69. Such a reinforced part 69 allows overcoming a higher resistance of the elastic spring elements 30 of the inlet valve 12 in accordance with the invention without deforming the pipette or dispenser tip 19'. This piston-shaped reinforced part 69 can be more pronounced (see left side of the pipette or dispenser tip 19') or less pronounced (see right side of the pipette or dispensed tip 19') and can comprise additional reinforcing ribs 70.

FIG. 14 shows a vertical sectional view through a third embodiment of a sample container 57 in accordance with the invention, comprising a lid 4 which is connected via an elastic tab 25 and to which is attached a valve body 61 via a further elastic tab 25, which valve body is integrally produced together with the lid 4 and the sample container 57.

FIG. 14A shows the open sample container 57 with the inner chamber 2, the lid 4 and the valve body 61, as can be preferably produced as one piece by means of injection molding techniques in one work step. One advantage of this third embodiment over the second embodiment shown in FIG. 13 is the integral (one piece) configuration: All required parts for producing the sample container 57 with a functional self-closing inlet valve 12 for charging the inner chamber 2 of said sample container 57 with a liquid 18 are present and cannot be lost. An inlet valve 12 is therefore especially preferred in which the closure element 4 which is configured as a reversibly closable lid comprises a collar 26 which is connected by means of an elastically deformable tab 25 to the chamber system 1 or the sample container 57, wherein preferably the valve body 61 comprising the blocking element 14, the pressing part 20 and the throat 21 is connected to the collar 26 of the closure element 4 by means of an elastically deformable tab 25.

FIG. 14B shows the open sample container 57 with the inner chamber 2 and the valve body 61 inserted into the lid 4. The valve body 61 is pivoted by 180° by bending the tab 25 and is inserted from below into the upper opening 27 of the collar 26 of the lid 4. The valve body 61 is then moved further in the direction of the first axis 6 until its blocking element 14 penetrates the inlet opening 5, which pressurizes the sealing element 16 configured as a continuous annular sealing lip 16' with the sealing surface 63 on the convex exterior side 64 of the blocking element 14 and simultaneously slightly deforms the spring elements 30 standing upright from the shoulder 68 of the lid 4. As a result, the spring elements 30 produce a force, which holds the valve body 61 in the direction of the first axis 6 in a closed position 15 against the resistance of the sealing lip 16' which is also preferably elastic.

FIG. 14C shows the closed sample container 57 with the valve body 61 in the closed position 15. The sample container 57 of FIG. 14B was sealed by inserting the closure element or lid 4 connected to the sample container 57 by a flexible deformable tab 25. In this state, there is frictional engagement between an annular insertion wall 66 of the lid 4 and the inner wall 3 of the sample container 57. The lid 4 preferably comprises a nose 67 on the side which is opposite of the flexible deformable tab 25, which nose simplifies the opening of the lid 4. The collar 26 and the annular insertion wall 66 of the lid 4 are preferably connected to each other via a shoulder 68. Said shoulder 68 forms a stop for the upper edge of the inner wall 3 of the sample container 57 during the insertion of the lid 4 into the sample container 57, so that the lid 4 and therefore also the inlet valve 12 always assume precisely the same position in their closed state. It is highly advantageous for the automated or robotized supply of liquids 8 to the inner chamber 2 of the sample container 57 that the lid 4 of the sample container 57 and therefore also the valve body 61 are always located precisely at the same location. A microplate tray 58 for accommodating such sample contains 57 (see FIG. 11) was already explained above and substantially facilitates the precise alignment and secure holding of the sample containers 57. The valve space 62 is clearly shown, which encloses the valve body 61 at least partly in the region of throat 21.

FIG. 14D shows the closed sample container 57 with the valve body 61 in the open position 17. The valve body 61 assumes this open position 17 after a movement in the direction of the first axis 6 because it was moved downwardly against the resistance of the elastic spring elements 30. This movement ensures that the sealing surface 63 on the convex exterior side 64 of the blocking element 14 is moved to such an extent away from the sealing element 16 configured as an annular continuous sealing lip 16' that the inlet opening 5 is released at least partly for allowing the flow of the liquid 18. In this third embodiment of the sample container 57 in accordance with the invention or in this fifth embodiment of the inlet valve 12 in accordance with the invention, the valve body 61 comprises a side wall 28 integrally attached to the pressing part 20, which side wall comprises a shoulder 29 on its upper end. Said shoulder 29 defines a maximum open position 17 of the inlet valve 12 and a maximum deformation of the spring mechanism 13 or the spring elements 30 during the downward pressing of the pressing part 20 with a tool 19 or with a laboratory pipette 19'.

| List of reference numerals | |
| --- | --- |
| 1 | Chamber system |
| 2 | Inner chamber |
| 3 | Inner wall |
| 4 | Closure element, lid |
| 5 | Inlet opening |
| 6 | First axis |
| 7 | Outer chamber |
| 8 | Outer wall |
| 9 | Pipetting opening |
| 10 | Second axis |
| 11 | Transfer device |
| 12 | Inlet valve |
| 13 | Spring mechanism |
| 14 | Blocking element |
| 15 | Closed position |
| 16 | Sealing element |
| 16' | Sealing lip |
| 16" | Annular web |
| 17 | Open position |
| 18 | Liquid |
| 19 | Tool |
| 19' | Laboratory pipette, pipette tip, dispenser tip |
| 20 | Pressing part |
| 21 | Throat |
| 22 | Liquid passage |
| 23 | Open passage region |
| 24 | Stop surfaces |
| 25 | Deformable tab |
| 26 | Collar |
| 27 | Upper opening of 26 |
| 28 | Side wall of 20 |
| 29 | Shoulder of 28 |
| 30 | Spring element |
| 31 | Transition |
| 32 | Base insert |
| 33 | Insert wall of 32 |
| 34 | Base |
| 35 | Bottom edge of 32 |
| 36 | Bottom edge 8 |
| 37 | Base area of 1 |
| 38 | Lowermost point of 34 |
| 39 | Ejection element |
| 40 | Spring rings |
| 41 | Integral valve element |
| 42 | Snap-in cam |
| 43 | Outer thread of 4 |
| 44 | Stop ring of 4 |
| 45 | Inner thread of 3 |
| 46 | Shoulder of 3 |
| 47 | Opening of 46 |
| 48 | Insert |
| 49 | Outer part |
| 50 | Base part |
| 51 | Identification element |
| 52 | Base element |
| 53 | Base opening |
| 54 | Retaining element |
| 55 | Pierceable base region |
| 56 | Piercing tip |
| 57 | Sample container |
| 58 | Microplate tray |
| 59 | Seats |
| 60 | Guide rib |
| 61 | Valve body |
| 62 | Valve space |
| 63 | Sealing surface |
| 64 | Convex exterior side of 14 |
| 65 | Concave inner side of 14 |
| 66 | Annular insertion wall |
| 67 | Nose |
| 68 | Shoulder of 66 |
| 69 | Piston-shaped reinforced part |
| 70 | Reinforcing rib |

The invention claimed is:

1. An inlet valve (12) for charging an inner chamber (2) of a chamber system (1) or sample container (57) with a liquid

(18) or for insertion of a sample into an inner chamber (2) of a chamber system (1) or sample container (57), wherein the inlet valve (12) is configured for supplying the liquid (18) or sample by means of a tool (19,19') and comprises a first axis (6), and wherein the inlet valve (12) comprises an inlet opening (5) and is configured to be automatically reclosing such inlet opening (5), characterized in that the inlet valve (12) comprises:
  (a) a valve body (61) which is arrangeable in the inlet opening (5) and is movable in the direction of the first axis (6) between a closed position (15) and an open position (17), comprising:
    a blocking element (14) which comprises a sealing surface (63);
    a pressing part (20) which is subjectable to action by a tool (19,19'), and which comprises a liquid passage (22) in the region of the first axis (6);
    at least one open passage region (23), which is configured on the one hand to open into the liquid passage (22) of the pressing part (20) and is arranged on the other hand to open into a valve space (62);
  (b) a valve space (62) at least partly enclosing the valve body (61);
  (c) a spring mechanism (13;30;40) which is arranged on the one hand to act on the pressing part (20) or the blocking element (14) and on the other hand to act on a wall (3) of the chamber system (1) or a closure element (4) of the sample container (57), and
  (d) a sealing element (16) which is connected to an inner wall (3) of the chamber system (1) or a closure element (4) of the sample container (57);
  wherein the spring mechanism (13;30;40) is configured in such a way that it presses the sealing surface (63) of the blocking element (14) in the closed position (15) of the valve body (61) against the sealing element (16), and wherein the valve body (61) of the inlet valve (12) is configured in such a way that it can be brought to the open position (17) by pressing the pressing part (20) against the resistance of the spring mechanism (13;30; 40).

2. An inlet valve (12) according to claim 1, characterized in that the valve body (61) is produced in one piece or at least configured as one piece, wherein the blocking element (14) and the pressing part (20) of the valve body (61) are configured to be penetrated by the first axis (6).

3. An inlet valve (12) according to claim 1, characterized in that the liquid passage (22) is arranged concentrically in relation to the first axis (6).

4. An inlet valve (12) according to claim 1, characterized in that the valve body (61) is configured in a rotationally symmetrical way and comprises a circular sealing surface (63).

5. An inlet valve (12) according to claim 4, characterized in that the sealing surface (63) is arranged on an exterior side (64) of the blocking element (14) of the valve body (61) and forms an annular sealing connection with the sealing element (16) in the closed position (15) of the inlet valve (12).

6. An inlet valve (12) according to claim 1, characterized in that the sealing element (16) is configured as a continuous annular sealing lip (16') or as a continuous annular web (16") and releases the inlet opening (5), the cross-section of which is smaller than the geometrically similar cross-section of the blocking element (14).

7. An inlet valve (12) according to claim 1, characterized in that the at least one open passage region (23) is configured to originate at a substantially right angle from the first axis (6).

8. An inlet valve (12) according to claim 1, characterized in that the closure element (4) is configured as a closable or reversibly closable lid or as a closure element of a chamber system (1) or a sample container (57), and comprises the pressing part (20) and the blocking element (14).

9. An inlet valve (12) according to claim 8, characterized in that the closure element (4) which is configured as a closable lid snaps into the inlet opening (5) of a sealing lip (16') during the closing insertion into the chamber system (1) or into the sample container (57).

10. An inlet valve (12) according to claim 8, characterized in that the closure element (4), which is configured as a closable lid, is connected by means of an elastically deformable tab (25) to a collar (26) of the chamber system (1) or the sample container (57).

11. An inlet valve (12) according to claim 8, characterized in that the closure element (4), which is configured as a reversibly closable lid, further comprises the spring mechanism (13) and is configured so that it can be inserted for closure into the chamber system (1) or into the sample container (57) by being screwed in.

12. An inlet valve (12) according to claim 11, characterized in that the pressing part (20) further comprises the spring mechanism (13).

13. An inlet valve (12) according to claim 8, characterized in that the closure element (4), which is configured as a reversibly closable lid, comprises a collar (26) which is connected by means of an elastically deformable tab (25) to the chamber system (1) or the sample container (57).

14. An inlet valve (12) according to claim 13, characterized in that the valve body (61) comprising the blocking element (14) and the pressing part (20) is connected to the collar (26) of the closure element (4) by means of an elastically deformable tab (25).

15. An inlet valve (12) according to claim 14, characterized in that the pressing part (20) comprises stop surfaces (24) which are configured so that they can be pressurized by the spring mechanism (13;30;40).

16. An inlet valve (12) according to claim 15, characterized in that the spring mechanism (13) is configured as a plurality of upright spring elements (30) or a plurality of spring rings (40).

17. A chamber system (1) for the treatment of samples, comprising:
  (a) an inner chamber (2) which is enclosed at least partly by an inner wall (3) and can be sealed by a closure element (4);
  (b) a closure element (4) which comprises an inlet opening (5) leading to the inner chamber (2), wherein said inlet opening (5) defines a first axis (6) which penetrates the inlet opening (5);
  (c) an outer chamber (7) which encloses the inner chamber (2) at least partly, which outer chamber is enclosed at least partly by an outer wall (8), wherein the outer wall (8) comprises an opening (9) leading to the outer chamber (7), which opening (9) defines a second axis (10), and
  (d) a transfer device (11) which is configured for fluidically connecting the inner chamber (2) to the outer chamber (7);
  characterized in that the chamber system (1) comprises an inlet valve (12) according to claim 1 which comprises the inlet opening (5).

18. A microplate tray (58) for accommodating chamber systems (1) according to claim 17, characterized in that the microplate tray (58) comprises seats (59), which are adjusted with respect to their size to the dimensions of the outer walls (8) of the chamber systems (1) in such a way that the chamber systems (1) can be inserted in an interlocking and tightly fitting fashion into said seats (59).

19. The use of a chamber system (1) according to claim 17 for the treatment of samples, wherein the treatment is chosen from the group comprising chemical reactions, synthesis, incubation, lysis, extraction, solid-liquid extraction, polymerase chain reaction (PCR), storage and transport.

20. A sample container (57) for storing or treating samples, comprising:
- (a) an inner chamber (2) which is enclosed at least partly by an inner wall (3) and is sealable by a closure element (4);
- (b) a closure element (4) which comprises an inlet opening (5) leading to the inner chamber (2), wherein said inlet opening (5) defines a first axis (6) which penetrates the inlet opening (5);

characterized in that the sample container (57) comprises an inlet valve (12) according to claim 1 which comprises the inlet opening (5).

21. A microplate tray (58) for accommodating sample containers (57) according to claim 20, characterized in that the microplate tray (58) comprises seats (59), which are adjusted with respect to their size to the dimensions of the inner walls (3) of the sample containers (57) in such a way that the sample containers (57) can be inserted in an interlocking and tightly fitting fashion into said seats (59).

22. The use of a sample container (57) according to claim 20 for the treatment of samples, wherein the treatment is chosen from the group comprising chemical reactions, synthesis, incubation, lysis, extraction, solid-liquid extraction, polymerase chain reaction (PCR), storage and transport.

* * * * *